United States Patent
Wagman et al.

(10) Patent No.: US 6,941,016 B1
(45) Date of Patent: Sep. 6, 2005

(54) METHOD FOR FINDING CONTOURS IN AN IMAGE OF AN OBJECT

(75) Inventors: Adam Wagman, Framingham, MA (US); Ivan Bachelder, Newton, MA (US)

(73) Assignee: Cognex Technology and Investment, Natick, MA (US)

( * ) Notice: Subject to any disclaimer, the term of this patent is extended or adjusted under 35 U.S.C. 154(b) by 605 days.

(21) Appl. No.: 10/035,993

(22) Filed: Dec. 31, 2001

(51) Int. Cl.[7] ................................................. G06K 9/48
(52) U.S. Cl. ...................................... 382/199; 382/149
(58) Field of Search ................................ 382/103, 141, 382/149, 152, 173, 177, 181, 199, 205, 242, 260, 266, 267, 284; 348/92; 356/237.1, 238.3

(56) References Cited

U.S. PATENT DOCUMENTS

| | | | |
|---|---|---|---|
| 4,876,729 A | * 10/1989 | Watanabe et al. ............ 382/199 |
| 5,179,419 A | 1/1993 | Palmquist et al. ......... 356/73.1 |
| 5,319,734 A | 6/1994 | Buzzetti ..................... 385/140 |
| 5,535,002 A | 7/1996 | Csipkes et al. ............. 356/496 |
| 5,543,915 A | 8/1996 | Csipkes et al. ............. 356/477 |
| 5,596,672 A | 1/1997 | Harman et al. ............. 385/147 |
| 5,600,439 A | 2/1997 | Csipkes et al. ............. 356/477 |
| 5,636,020 A | 6/1997 | Csipkes et al. ............. 356/505 |
| 5,657,131 A | 8/1997 | Csipkes et al. ............. 356/401 |
| 5,671,049 A | 9/1997 | Csipkes et al. ............. 356/496 |
| 5,727,327 A | 3/1998 | Wakabayashi et al. ........ 33/520 |
| 5,729,622 A | 3/1998 | Csipkes et al. ............. 382/151 |
| 5,729,966 A | 3/1998 | Grulick ....................... 57/293 |
| 5,768,401 A | 6/1998 | Csipkes et al. ............. 382/255 |
| 5,768,409 A | 6/1998 | Csipkes et al. ............. 382/151 |
| 5,809,162 A | 9/1998 | Csipkes et al. ............. 382/108 |
| 5,857,047 A | 1/1999 | Strand et al. ................. 385/88 |
| 5,857,049 A | 1/1999 | Beranek et al. ............... 385/91 |
| 5,862,250 A | 1/1999 | Csipkes et al. ............. 382/141 |
| 5,898,494 A | 4/1999 | Csipkes et al. ............. 356/511 |
| 5,923,781 A | 7/1999 | Csipkes et al. ............. 382/199 |
| 5,995,212 A | 11/1999 | Dar et al. ................... 356/73.1 |
| 6,069,991 A | 5/2000 | Hibbs-Brenner et al. ..... 385/50 |
| 6,088,498 A | 7/2000 | Hibbs-Brenner et al. ..... 385/52 |
| 6,105,396 A | 8/2000 | Glodis et al. ................. 65/377 |
| 6,108,444 A | * 8/2000 | Syeda-Mahmood ......... 382/186 |
| 6,183,343 B1 | 2/2001 | Buzzetti ........................ 451/5 |
| 6,753,965 B2 | * 6/2004 | Kumar et al. ............... 356/431 |

OTHER PUBLICATIONS

Evan Lubofsky, Machine vision takes guesswork out of fiber–polishing inspection, Laser Focus World, Sep., 2001.

* cited by examiner

*Primary Examiner*—Daniel Miriam
(74) *Attorney, Agent, or Firm*—Brian Michaelis

(57) ABSTRACT

A method is provided for robustly and efficiently identifying contours in an image of an object. Features are extracted from an image, typically using a Sobel edge detector or a set of large oriented filters, and are locally chained to form contour segments of particular character, such as line segments. A spatial hash table is used to access the contour segments according to the location of their endpoints. Candidate sets for joining to grow contours are reduced by considering only segments having ends in adjacent spatial hash bins. Contour constraints are applied to appropriately choose among the candidates to form contours. The method facilitates robust and efficient scratch detection of fiber-optic end faces, or of any surface that may have smoothly curved scratches.

30 Claims, 5 Drawing Sheets

METHOD FOR FINDING CONTOURS IN AN IMAGE OF AN OBJECT

FIELD OF THE INVENTION

The invention relates to machine vision, and more particularly to machine vision inspection methods.

BACKGROUND OF THE INVENTION

Various manufacturing processes and other industrial processes require inspection of manufactured and processed parts to identify and/or classify defects.

Automated inspection methods using machine vision techniques are commonly used to perform such inspections. Due to the vast number of possible surface qualities and textures, machine vision applications that are useful for inspecting certain surface types may not be well suited for inspecting certain different surface types. Variations in image feature contrast and reflectivity, for example, can hide critical defects in a machine vision image.

Optical fiber manufacturing operations, for example, use various machine vision inspection techniques for quality assurance or in-process inspections of fiber ends. In fiber-optic cable production, once a fiber has been cleaved, it is polished to ensure its end face is smooth and clean. During the polishing process, the fiber is typically placed against an abrasive disc that polishes the fiber end surface. This process can cause defects, which if undetected can block the proper transmission of light through a fiber. Most fiber end defects can be categorized into one of four categories: spots, scratches, cladding boundary defects, and cracks. Lightwave signals that are transmitted through optical fibers are degraded when photons that make up the light wave encounter such defects and are deflected. While certain defects are considered acceptable and will not interfere with transmission of lightwave signals, others—especially those near the core of the fiber—may be critical. Fiber end defects must be identified and classified during the manufacturing process so that the fibers can be cleaned, repolished or discarded entirely, depending on the size and location of the defects.

Optical fiber manufacturers have traditionally relied on manual inspection to detect end surface defects that remain after polishing. One typically performs such manual inspections by inserting a cable into a fiber microscope, which is also called a fiberscope, and analyzing a magnified view of the fiber end connector (which includes the fiber end and ferrule). Although manual inspection methods are expensive, the alternative, i.e., machine vision inspection of optical fiber end surfaces, has proven difficult to implement. Optical fiber end surface inspection has presented many obstacles to the application of automated inspection techniques using machine vision systems. While standard machine vision methods are adequate for many industrial machine vision applications, highly specialized operations, like inspecting polished fiber ends, often require specialized vision methods. A machine vision method implemented in software and/or hardware is typically called a vision "tool."

Scratch defects on fiber end surfaces appear as straight or curved lines in an acquired image. Machine vision systems used for inspecting fiber ends detect these lines to locate defects. The lines often have very low contrast and are speckled with noise and texture artifacts and therefore do not always appear continuous to common edge detection techniques that use local metrics or small kernel sizes. Such contours that appear discontinuous in an image are particularly difficult for machine vision systems to identify. These straight or curved contours are the image features that are to be identified and located when inspecting fiber ends for scratches.

One common technique well known in the art of computer vision is called binarization, where pixels in an image are classified into two groups. One group typically consists of pixels with a grey level value above a threshold and the other consists of pixels with a grey level below the same threshold. Once pixels are labeled as belonging to one of two groups, a technique called connectivity analysis can be performed. Connectivity analysis considers pixels that touch each other either at the sides, top or bottom or diagonally at the corners to be connected. Groups of connected pixels are commonly referred to as blobs. This technique is commonly referred to as blob analysis. Once blobs are extracted from an image, they can be analyzed by calculating various metrics, including but not limited to area, first and second order moments, location, orientation and perimeter. The metrics could then be used to identify scratch-like features in an image.

The advantages of binary techniques such as blob are simplicity and high speed. However, the major shortcoming of blob and other binary techniques is that a gray level threshold must be calculated. In actual applications, a separate processing step must be run to determine a binarization threshold. This is not always easy to do given that there may be many confusing features in the image. In many cases, especially in fiber and inspection, a single threshold may not exist due to low frequency intensity gradients across the image caused by the backlighting effects and the existence of the fiber core. Another shortcoming of binary techniques is that they only provide whole pixel accuracy. Also, scratches can have low contrast thus making it very difficult to find a usable threshold. When the texture and noise in the image has intensity values that vary from the mean of the background by as much as the contrast of the scratch itself, a binarization of the image will include many extraneous pixels in the same group as the scratches. This extraneous data must then be factored out when recognizing and localizing scratches.

Another common method of image analysis used in industry is referred to as template matching, in which a template is compared with like-sized subsets of the image over a range of positions. The position having the greatest match with the template is determined to be the position of the object in the image. A numeric representation of the degree of match can be generated and used for inspection purposes. One disadvantage of template matching methods is that they require a training step wherein a model image or template of objects to be located is generated and stored. For the inspection of fiber end surfaces, it is very difficult to generate models of defects such as scratches due to their variability. One would have to create models of potential scratches at many possible angles, lengths and curvatures. All these models would then have to be searched for in an image. This type of exhaustive technique is impractical since it would not run in a reasonable amount of time. There are many different types of template matching techniques used in computer vision such as matching with binary images, matching with grey scale images and normalized correlation which can handle differences in the mean pixel grey level values between model and image. All of these variations on template matching suffer from the same shortcoming as mentioned above.

A method of geometric pattern matching was developed to overcome the limitations of image-intensity-based template matching methods by representing objects as geometric shapes independent of shading and independent of a discrete grid. The geometric pattern matching method can tolerate and measure wide variations in orientation and size of objects in an image, can be performed with high speed and high accuracy, and is able to tolerate severe shading variations. An exemplary geometric pattern-matching tool called PatMax® is available from Cognex Corporation of Natick, Mass.

The geometric pattern matching technology used in PatMax includes methods for feature detection, training, affine searching, pose refinement, and inspection. Feature detection produces a geometric description of object boundaries as an ordered list of boundary points that lie along contours separating dissimilar regions in the image. Unlike traditional edge detection, which simply marks certain pixels as edges, each boundary point specifies positions and orientation as real-valued coordinates.

The geometric descriptions of objects produced by feature detection can be translated, rotated, scaled, stretched and otherwise transformed with no loss in fidelity. PatMax uses a six-degree-of-freedom affine transform which includes two degrees of freedom of translation and one each of rotation, scale, aspect ratio and shear. Each non-translation degree of freedom is specified as either a fixed value or a range of values to be searched. A fixed value for a degree of freedom allows a transformed version of the trained pattern to be found with no time penalty. For example, a single square pattern can be trained and used to find rectangular objects at a variety of known sizes and shapes by setting appropriate fixed values for the scale degrees of freedom.

In order to recognize an object in an image, analysis tools, such as PatMax, must first be trained by acquiring and storing an image of a representative object or model. The model can be developed as an image of an actual object or can be synthetically constructed using CAD tools. During runtime operation, the machine vision system acquires an image that may include the object of interest at any scale or orientation relative to the viewing device. The analysis tools will recognize the object in the image and compute the degree of rotation, scale and translation of the object in the image relative to the trained model. This computation is sometimes referred to as an alignment of the object. Alignment may also allow other degrees of freedom.

While PatMax has some flexibility in performing a rotation and scale invariant search, it is not optimal for finding scratches on fiber ends. One reason is that scratches that appear as lines are very self-similar along the line itself. Geometric pattern matching techniques will have difficulty localizing line models along lines in an image. Scratches may be of any length and finding lines of varying lengths with a single line model of a fixed length that can be scaled has problems. The tool will find a good match in the dimension perpendicular to the line, but along the line there can be many potential matches, all with an equal score. The many good matches can make the tool take a long time to executed and when the line model is allowed to change scale, the match calculation can become numerically unstable. PatMax is also susceptible to the problems with lower-level edge detectors as described next. PatMax also requires moderately sharp edge features with reasonable contrast.

Also, both template matching and geometric pattern matching techniques assume that the object to be found will have a consistent appearance, and this is usually not the case for scratches in a fiber end face. For example, the scratches can have a range of curvatures, and some may even have sharp turns. Thus, there is typically no affine transformation that could match a given curved scratch pattern to an actual curved scratch, since the shape may be different.

Scratches can be particularly difficult to detect because they usually have low contrast with respect to a fiber end surface. Various lighting methods can increase the contrast of scratches and cracks during image acquisition so that they can be more easily detected. For example, viewing a surface directly while applying side lighting, viewing a surface at an angle with lighting from the opposite angle, or transmitting light through the fiber core can make scratches and cracks more visible. These types of lighting and viewing angle changes can enhance the quality of the scratch contrast but still will not be enough to make simple vision techniques work.

Another method of detecting scratches is to project the image of the fiber end surface to form a one-dimensional (1D) projection image. This type of projection technique is well known in the art and involves summing the pixels along rows of an image such that the resulting image is a one-dimensional image that has as many elements as rows in the source image and each element contains the sum of all the pixels in a row. Lines that are lighter than the background and that are horizontal will appear as peaks in the 1D projection image. The location of the line is then determined from the row in which the peak occurred. This is generalizable to all angles where the image is rotated into position such that the candidate angle aligns to the horizontal rows. The shortcomings of this type of projection technique are that the length of lines cannot be determined and that only straight lines can be found. Projections are also very susceptible to confusion by bright spots. A bright spot appears on a projection exactly like a line with lower contrast.

Many machine vision methods require extracting what are called primitive or low-level features and then building more complex objects or features from those simple ones. The most basic low-level feature is a single pixel that has a grey value. A more complex feature would be an edge feature that results from applying a Sobel or Roberts operator that is well known in the art. These are small kernel operators (3×3 and 2×2) that return the direction and magnitude of the intensity gradient in the image at the location of the center of where the operator is applied. These operators are known in the art as edge detectors. While the previous techniques discussed (blob and template matching) analyzed the pixels of an image directly, the following techniques that have been used for scratch detection rely on processing the results of edge detectors that are called edge features.

Commonly used edge detectors have several shortcomings when used to detect scratches on fiber end surfaces. Scratches can be irregular at a small scale (1 or 2 pixels) but still appear uniform and straight at a larger scale. Scratches can also be faint and have low contrast. Since the support of the edge operator is no larger than 3×3, only sharp higher contrast edge features will be detected. Also, the small-scale irregularities of the scratches will generate many false edges and miss many valid edges such that the subsequent processing steps, such as chaining, have too many features to consider, thus making such processing run slowly and produce erroneous results.

Often the problem of detecting and tracing scratches becomes a problem of grouping features such as edge features to form higher-level contours. One well known method of grouping low-level features into contours or lines that can be called scratches is to perform a Hough transform on the image space.

The Hough transform aids in the detection of lines or arcs of a particular shape. Each arc or line has some free parameters that, when specified precisely, define the arc or line. The free parameters constitute the transform domain or the parameter space of the Hough transform. Pixels or other features in an image are mapped into the Hough parameter space, which is quantized into discrete bins called accumulator cells (a multidimensional array). Peaks in the accumulator array indicate that a line or an arc may exist at corresponding points in an image. See Robert M. Haralick and Linda G. Shapiro, *Computer and Robot Vision, Volume II*, p. 184 (1993).

When applied to identify straight lines, an implementation of the Hough transform, called "line Hough," is used; typically, edge features of an image are used as the immediate inputs to line Hough. The line Hough is limited to identifying straight lines and, by design, detects lines that are very sparse. For example, two short segments on opposite sides of an image that happen to be co-linear will be reported as a line even if they do not correspond to the same continuous line segment. The line Hough has additional limitations including the generation of large numbers of candidates that must each be separately verified.

A more general Hough transform is used to find curves of specific shapes and sizes. Arbitrary curves or contours, such as some fiber end scratches, however, cannot be found by any implementation of the Hough transform. Furthermore, the quantization of Hough space into accumulator cells can introduce significant error in the reported location of candidate lines or curves. Hough transforms also typically rely on lower level edge detection such as Sobel or Robert transforms and therefore suffer all of the limitations of those lower level operations.

Unlike Hough transform methods, chaining methods operate locally and do not connect unrelated pixels that may happen to fall on a predefined contour. However, the local scope of chaining methods can prevent them from bridging small gaps to connect edge segments that do belong to the same contour. Such small gaps occur quite frequently in images and are especially problematic in low contrast defects such as scratches in optical fiber end surfaces.

U.S. Pat. No. 5,995,212 to Dar et al. (hereinafter referred to as "the Dar patent"), which is hereby incorporated by reference in its entirety, describes a method of inspecting an optical fiber for scratches using a window technique which implements the Hough transform. The method according to the Dar patent disadvantageously requires extensive pre-processing to isolate regions of suspected scratches in which to apply the Hough transform. More significantly, the method according to the Dar patent suffers the same disadvantages of the general Hough transform in that it connects widely separated pixels that may not be part of a common contour.

Another approach to identifying contours in an image is chaining of edge features. U.S. Pat. No. 5,179,419 to Palmquist et al. (hereinafter referred to as "the Palmquist patent"), which is hereby incorporated by reference in its entirety, describes a method for detecting, classifying and quantifying defects including scratches. The method taught by the Palmquist patent breaks edge features in an image into segments to distinguish overlapping defects. Connected segments are decomposed and labeled to group pixels based on connectedness. Segments are connected to follow curves and break at sharp corners. Small segments caused by noise are discarded. The method of chaining edge segments taught by the Palmquist patent uses well-known filters such as Sobel filters. The chaining steps performed by Palmquist are much like base chaining functions performed by several image analysis tools, including PatMax.

The method disclosed by the Palmquist patent disadvantageously requires the acquisition of an optimal focus image and auxillary images behind and in front of the optimal focal positions. Since the method in the Palmquist patent uses simple Sobel edge detection, it suffers from all the shortcomings associated with this type of feature extraction technique as described previously.

U.S. Pat. No. 6,167,150 to Michael et al. (hereinafter referred to as "the Michael patent"), which is hereby incorporated by reference in its entirety, discloses a method of detecting edges in an image that represent scratches in disk drive heads. The method disclosed in the Michael patent detects edges in the image and determines if edges are connected using the magnitude and orientation of the edges. After eliminating edges based on magnitude, the orientation of neighboring edges are compared and are determined to form connected edges when the angle of the neighboring edges are within a pre-determined range of each other.

The method disclosed in the Michael patent works well to detect very thin scratches in the order of one pixel wide because it is designed to locate edges. Wider scratches, in the order of five to ten pixels wide, however, are recognized as two separate entities because each edge of such wider scratches is separately detected. This redundant reporting of found features requires additional processing, for example, to associate two edges with a common scratch feature. In addition, fiber scratches that are irregular, low in contrast, or formed by a series of dots that are not necessarily connected, do not form continuous connected edges and will not be detected by this method. In fact, edge detectors may not detect a string of dots at all.

SUMMARY OF THE INVENTION

The invention provides a general method for finding contours in an image of an object. In a particular embodiment, the invention finds contours that are straight lines or are curves with a large radius of curvature. In an illustrative embodiment, the invention detects scratch defects in a polished end-face of a fiber-optic cable.

In accordance with the principles of the present invention, features are extracted from an image, those features are chained using local connectivity analysis with chaining constraints to form contour segments, contour segments are successively selected as candidates for joining together to form contours using hash functions to greatly reduce the number of candidates that need to be considered, and contour constraints are used to choose among the candidates. An example of a contour constraint useful for finding straight lines with relatively small internal gaps would be that the endpoints of the two contour segments would need to be close and the overall RMS error of a line fit through the points of both segments would need to be small.

In an illustrative embodiment, the features are edgelets produced by generating a magnitude image and angle image, using truepeak (non-maximal suppression along the gradient) to determine approximate edge location, and interpolation of magnitude values to produce a location with subpixel accuracy. Edgelets are small segments of edges with magnitude, orientation, and approximate 2D location. In another illustrative embodiment, a Sobel edge detector is used to generate the magnitude and angle images. In another illustrative embodiment, a set of oriented filters is used to generate the magnitude and angle images.

In an illustrative embodiment, the present invention greedily combines contour segments into larger contours (which may have gaps). To avoid increasing complexity, two contour segments are considered for combining based primarily on the minimum distance between the endpoints of the segments. A decision on whether to combine the segments is then based on a metric that represents the probability that both segments come from the same contour. To find straight lines, for example, the RMS fit error of a line fit to all points of both segments can be used as a metric. To find slightly curved contours, the radius of curvature within some fit error can be computed and used as a metric.

This process can be iterated, optionally varying the constraints on the metrics, to allow efficiently building up of higher order features. For example, once an initial pass is made which considers only very close contour segments, a second pass can then be made where a greater separation is allowed for groups of segments of a certain length, perhaps also placing tighter constraints on the angles.

This invention overcomes limitations of the prior art by providing methods for effectively analyzing surface inspection images to identify low contrast contours and discontinuous contours of arbitrary shape.

The present invention makes contour identification in machine vision images more efficient and robust. Curves that cannot be found by other techniques can be found by methods according to the present invention. Disadvantages of the Hough transform including false correlation of sparse contour segments are overcome according to the present invention. Quantization error effects that plague known Hough transform methods are also avoided by the method of the present invention. The present invention further overcomes the disadvantages of known chaining methods by bridging local gaps in low contrast defects. The present invention further overcomes the disadvantages of known global contour finding methods by using hash functions to reduce the computational complexity.

BRIEF DESCRIPTION OF THE DRAWINGS

The above and further advantages of the invention may be better understood from the following detailed description, in conjunction with the following figures, referred to herein and constituting a part hereof, wherein.

DETAILED DESCRIPTION

The method according to the present invention locates contours in an image and is particularly useful in detecting defects such as scratches in optical fiber end surfaces. The method provides enhanced detection of such scratches, which typically appear as faint sets of locally disconnected features having low contrast in machine vision images.

Figure 1:
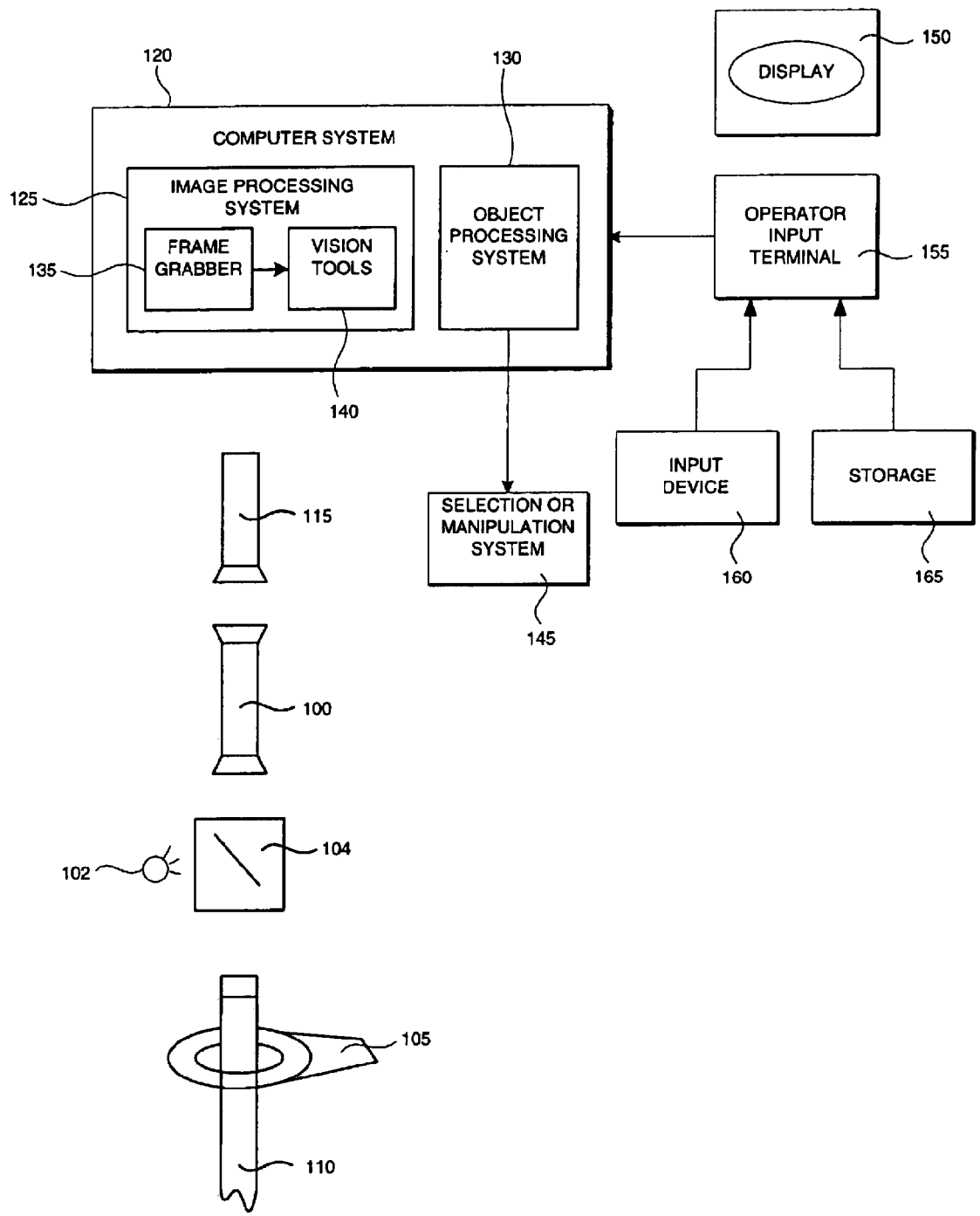
FIG. 1 is a schematic block diagram of a conventional machine vision system.

FIG. 1 illustrates in schematic form an example of a machine vision system that can utilize the process of the present invention. The example system demonstrates the inspection of the end-face of an optical fiber, but this example is merely illustrative and not restrictive. In the example system, a fiber microscope 100 examines an optical fiber 110 held in a mounting device 105. The fiber may also be presented to the system by other well-known mechanisms. When a fiber is in the mount, an image stream of the fiber is created by a camera system 115 in a conventional manner. Light is provided by a light source 102, and a half-silvered mirror 104 is used to direct the light onto the fiber end-face while also allowing the fiber end-face to be imaged by the camera 115. Other arrangements of optics and lighting are possible. The image stream created by the camera 115 is provided to a computer system 120 that processes the image according to the method of the present invention.

The computer system 120 in general comprises an image processing system 125 and an object processing system 130. The image processing system, in turn, includes a frame grabber 135 that creates a series of fixed images from the image stream generated by camera 115. The series of fixed images are provided to a vision tool 140 that detects and measures scratch defects in the images in accordance with the principles of the present invention. The vision tool may also detect other types of defects or make additional measurements. The results of the vision tool are then passed to the object processing system 130, which controls a selection or manipulation system 145. The selection or manipulation system treats each fiber 110 based on the results of the object processing 130. For example, if the vision tool finds no critical defects in the fiber, then the object processing system may direct the manipulation system to transfer the fiber to a bin of acceptable fibers, but if the vision tool finds a critical defect, then the object processing system might direct the manipulation system to send the fiber off to be polished again, followed by reinspection. The manipulation system might consist of just a human operator or might be automated. Many other actions are also possible, especially when the present invention is used for applications other than fiber end-face inspection.

Figure 2:
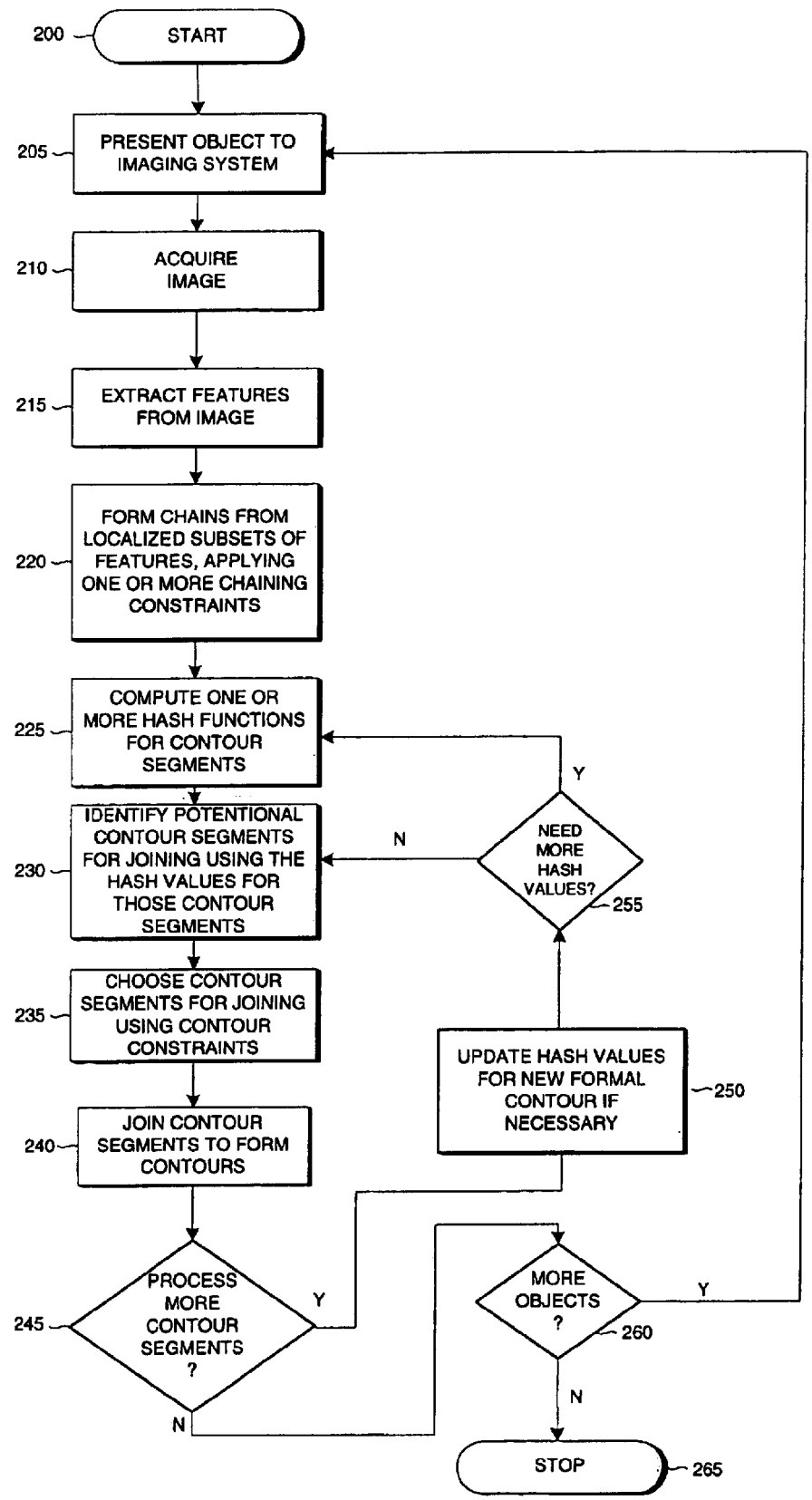
FIG. 2 is a top-level flowchart of the invention.

Steps in the method for finding contours in an image of an object are shown in FIG. 2. The process begins in step 200 and proceeds to step 205, where an object is presented to the camera 115, such as by placing a fiber in the mounting device. In step 210, an image of the object is acquired as discussed above.

In step 215, features are extracted from the image. Many different techniques are possible for extracting features that are relevant to contour finding, but the features are usually edges or portions thereof or line or curve segments. However, other types of features are also possible and are within the scope of the present invention. For example, in some applications the contours of interest might be indicated by bright pixels, and such bright pixels could be used as the features.

Processing then proceeds with step 220, where chains are formed from localized subsets of features, applying one or more chaining constraints. Typically, the chains are formed from edgelets that are adjacent on the pixel grid and that have compatible angles, and magnitude thresholds may also be used to constrain which edgelets form chains.

In many applications, a single contour will consist of two or more chains that have gaps between their ends. In order to efficiently find chains that belong to the same contour, without having to consider all possible combinations of chains, one or more hash functions are used to compute hash values for some or all of the chains in step 225. Only chains with identical or similar hash values are considered as potential candidates for belonging to the same contour. For example, one hash value (per chain endpoint) might represent the coarsely quantized location of one chain endpoint, and similar hash values would be the hash values representing nearby coarsely quantized locations; another hash value might represent the angle or curvature of a chain, and similar hash values would be the hash values representing similar angles or curvatures. In step 230, a seed chain is chosen and candidate chains for joining with it to form a contour are determined based on their hash values. In step 235, chains are chosen for combination from amongst the candidates using a set of contour constraints.

In step 240, the chosen chains are joined to form a contour segment. Next, in step 245 a determination is made whether to process more chains. For example, processing might proceed as long as any chain had not yet been joined to a contour or considered as a seed chain, or it might proceed only until at least one contour meeting certain criteria had been found. If a decision is made to process more chains, then the hash values for the newly formed contour segment may be updated in step 250. For example, if the hash values represent the coarse locations of the two endpoints, then the contour segment will have hash values representing the two new endpoints, and not the endpoints that were connected to form the segment. In step 255, a determination is made whether additional hash values need to be computed. Typically, no additional hash values are needed if all chains had hash values computed originally in step 225. If more hash values are needed, processing returns to step 225 to compute those hash values; otherwise, processing returns to step 230 to choose a seed chain and identify candidate chains for joining to it. Note that the seed "chain" and candidate "chain" may also be contour segments at this point in the processing. In other words, contour segments can be used in exactly the same way as chains at all points in the processing, thus allowing iterative or recursive grouping of contour segments. In a typical implementation, this property is most easily achieved by representing the initial chains as contour segments.

If, in step 245, the decision is made not to process more chains, then the current image of the object has been completely analyzed, and a determination is made in step 260 whether to process images of additional objects (or perhaps even additional images of the current object, presumably after some modification, such as repolishing a fiber end). Processing thus may continue by returning to step 205 to present an object to the imaging system or may terminate at step 265.

Many feature extraction techniques may be used for step 215. In an illustrative embodiment, a Sobel edge detector generates gradient magnitude and gradient angle values for the image or region thereof, then non-maximum suppression using the gradient direction (also known as "truepeak") is performed to produce truepeak edgelets, and finally subpixel interpolation is performed to produce subpixel edge locations for the edgelets. Truepeak may also use a magnitude threshold to eliminate weak edges. These techniques are known to those skilled in the art. Note that truepeak responds only to edges and not to uniform gradients such as those caused by nonuniform diffuse lighting. Such edgelet generation is known to those skilled in the art, and one implementation is an edge detector available from Cognex Corp. Sobel is particularly useful in applications where the edges are fairly sharp. In another illustrative embodiment, a set of oriented filters, such as Gabor filters, is used to produce magnitude and angle information which is then processed as above to form oriented subpixel features. Oriented filters may be used for this purpose according to the method described in U.S. patent application No. 10/034,066 by Yusuf Akgul et al. entitled "Method for Extracting Features from an Image Using Oriented Filters" and filed on Dec. 28, 2001, which is hereby incorporated herein by reference in its entirety. Note that the features may actually be line segments or curve segments and not only edge segments; in particular, a line with substantial width may be represented by single "linelets" instead of pairs of edgelets, thus making detection of the line as a single contour (instead of as a pair of contours) much simpler. For simplicity, the term "edgelet" will be used to refer to all such features; such usage is not intended to be restrictive. Many other feature detectors are possible, and their use is within the scope of the present invention.

Large oriented filters are particularly useful for finding contours representing scratches in an image of a fiber end face. Such scratches are often quite faint and have irregular intensities and somewhat diffuse boundaries, and they are thus difficult to detect with local edge detectors such as Sobel. Various image preprocessing steps may also be useful when performing feature detection, as is known to those skilled in the art. For example, the image might be smoothed or sharpened using filters. Additionally or alternatively, the image might be subsampled to increase processing speed or to change the spatial scale to which the feature detector would respond.

The feature detection step 215 typically produces very low-level features such as edgelets, thus giving an indication as to whether a contour may pass through that pixel with its approximate tangent angle at that pixel. However, many of the features thus produced will actually be the result of noise and not of real contours of interest. There are typically very many such low-level features, so that trying to process them all with a global contour-finding procedure would be very computationally expensive (because of the large number of features) and not very robust (because of the relatively large uncertainty associated with such low-level features). Thus the chaining step 220 performs a local connectivity analysis on the low-level features to produce locally connected chains, which are segments of contours. Such a step is usually not sufficient in and of itself to find all the contours of interest, both because many contours appear to have gaps in typical images and because local connectivity rules cannot make optimal decisions at branch points where chains intersect). Chaining thus has the goal of producing fewer but more reliable features, called chains, for use by subsequent processing. The chains are usually line segments or curve segments.

Many techniques for chaining are known to those skilled in the art, and all are within the scope of the present invention. In order to be efficient, chaining typically makes use of the arrangement of the low-level features on the pixel grid and analyzes small local regions to connect the features into chains. Chaining may use constraints in order to connect only those features that seem to form part of a consistent contour. For example, two horizontally adjacent edgelets which are each horizontal might be connected to form part of a chain, but two horizontally adjacent edges where one is horizontal and one vertical may not be chained, especially if one wants to break chains at sharp corners. In general, if the angles of two adjacent edgelets are similar to each other and somewhat similar to the direction of the displacement between the edgelet positions, then the edgelets are considered compatible and it is reasonable to chain the two edgelets together. The precise chaining rules may vary. In an illustrative embodiment of the invention, the particular method generates only unbranched chains; each element of the chain has at most two neighbors and the chain does not intersect itself. In this embodiment, branches of the chain are broken into separate chains at any intersections. Alternative embodiments of the invention can easily be envisioned wherein a large web of unbroken branches remain connected.

Depending of the nature of the feature detection, the edgelets may have angles in the range [0, 360) degrees or only in the range [1, 180) degrees. For example, Sobel edgelets typically have a 360 degree range because, e.g. 0 degrees indicates a vertical line which is dark on the left and bright on the right while 180 degrees indicates a vertical line which is bright on the left and dark on the right. For edgelets with a 360-degree range, one should ordinarily not chain together edgelets whose angles differ by approximately 180 degrees. On the other hand, oriented filters which have been tuned to detect lines instead of just edges may have a meaningful range of only [0, 180) degrees, since 0 and 180 degrees may each indicate a vertical line without necessarily indicating its polarity. For edgelets with a 180-degree range, one should ordinarily consider edgelet angles near 0 and near 180 as being compatible with each other.

In an illustrative embodiment, as part of step 220 a sub-chaining step is performed that breaks the chains into linear pieces, i.e., straight line segments. The straight line segments are developed in the exemplary embodiment because the defects of interest, i.e. scratches, are typically straight lines or curves having large radii of curvature that can be constructed from connected straight line segments. The illustrative embodiment does not, for example, look for contours that have numerous sharp turns or which zigzag across an image. Such chain breaking can be easily accomplished by starting from one end of the chain and iteratively computing the best fit line to the first N points and breaking it at a value of N where the RMS error of the line fit exceeds some threshold. One may also want to break the chain at any edgelet where the edgelet angle differs from the angle of the fit line by too great an amount. Breaking then proceeds to process the rest of the chain, producing additional sub-chains if necessary. The illustrative embodiment uses an RMS threshold of 0.5 pixels and an edgelet-to-line angle threshold of 30 degrees. Alternatively, one might use information from the entire initial chain to determine optimal breaking points, as is known in the art. The sub-chaining step is merely illustrative and not restrictive, and the sub-chains will simply be referred to as chains except where the distinction is necessary for clarity. It is also possible to enforce chain linearity during the initial chaining step instead of by postprocessing the chains. Some embodiments may not want to enforce any sort of linearity constraint on the chains, since for high-contrast contours the chaining may tend to produce correct contour segments even when they are curved.

The chains comprise a set of fewer but higher-quality features than did the original features. Chains may be thresholded by length so that very short chains, e.g. those with fewer than four edgelets, are discarded. They may also be thresholded by magnitude (e.g. average or median magnitude of the edgelets) to discard week chains. In the illustrative embodiment, the average chain magnitude is used as the basis for magnitude thresholding. Discarding low-magnitude chains is an effective way to discriminate against video noise and low-level texture in images.

In some applications, the chains produced by step 220 may by themselves form a sufficient representation of the contours in the image. For example, the contours might be fairly high in contrast and consistent in appearance so that the edgelets representing the contour are continuously connected, or the particular application might not require that each maximal contour be detected as a single entity. However, it is usually desirable to determine the set of maximal contours, and contours often do not appear continuous in images. In particular, scratches in fiber end-face inspection images tend to appear as low-contrast discontinuous contour segments.

It is thus necessary to further analyze the chains, which represent contour segments, in order to combine and connect them to form the complete contours. In particular, it is necessary to determine which sets of contour segments each belong to the same contour, and in general this is a very difficult problem. However, it is often possible to specify a set of constraints on the possible appearances of contours so that it is possible to determine if two contour segments should be considered part of the same contour. The constraints typically also enable choosing the most likely interpretation among a set of possible interpretations of a set of contour segments as contours. For example, if the desired set of contours consists of straight lines, then two contour segments probably belong to the same contour if they are sufficiently co-linear.

Note that at this point, the contour segments could be input to an method such as the Hough transform to try to determine likely contours. However, such techniques disadvantageously require parameterization of contours, do not allow for more refined decisions based on constraints, and often produce a large number of false results in addition to the desired ones.

The most straightforward more general approach to determining a set of likely contours is to consider every contour segment for compatibility with every other contour segment. Such an approach requires $O(N^2)$ comparisons for N contour segments even if a greedy approach is used, in which a decision can be made for each segment independently; without a greedy approach, the combinatorics of determining all possible sets of compatible contour segments in computationally infeasible.

It is thus highly desirable to be able to identify which contour segments are compatible with a given contour segment without having to consider all of the other contour segments. According to the present invention, the values of one or more hash functions are computed for the contour segments; in an illustrative embodiment, the segments are then made accessible through a hash table. Hash tables are well known to those skilled in the art, and they allow efficient access to elements with a given hash value without having to search through the elements. It is also possible to use hash functions without actually using a hash table; such use still requires $O(N^2)$ comparisons in the overall method but allows each comparison to be done very rapidly. The purpose of the hash functions is to rapidly eliminate most incompatible contour segments without having to examine every other contour segment, and the hash functions should be chosen appropriately. Note that the hash functions do not replace the need for or use of contour constraints, but they simply make the application of such constraints computationally feasible. The reduction of the computation from $O(N^2)$ to a lower order, or even to $O(N^2)$ with a lower overall constant, is merely illustrative and not restrictive, but is meant to suggest that greater efficiency can be obtained by the proper choice of hash functions.

By their very nature, hash functions perform quantization, and such quantization implies that it is always possible to have two very similar elements that have different hash values. As a simple example, consider hashing the x-coordinate of a set of points with the hash function H(x)=floor(x/10), i.e. the hash value is the nearest lower multiple of 10. Then, for example, we have the desirable property that the relatively nearby values x=1.5 and x=5.4 both has to 0, while the relatively distant value x=115 hashes to the different value of 11. Thus, if we want to consider only nearby points as possibly "compatible," and we are trying to determine the set of points compatible with x=5.4, then this has function quickly eliminates most distant points. However, we also have the undesirable property that the two nearby values x=9.99 and x=10.01 have different hash values: H(9.99)=9 and H(10.01)=10. With this hash function, however, we can easily determine which other hash values are "similar" to a given hash value (namely H−1 and H+1), and then we can consider elements with similar hash values as well as those with identical hash values in order to eliminate the quantization problem. Similarly, if one wanted to hash angles with H(A)=floor(A/20) where A is in degrees, one would not that H+1 and H−1 were similar hash values, with the further specification that such addition and subtraction be performed modulo 18 (=360/20). For example, the angle A=359.99 would have H(A)=17, and hash values 16 and 0 would be considered similar. Clearly, one could also consider a larger range of hash values if one wanted to allow for increasing dissimilarity. In an illustrative embodiment, the hash functions are chosen such that elements which are somewhat similar have similar hash values, and it is easy to determine the set of hash values which are similar to a given hash value. In general, for an arbitrary metric M where the similarity of two elements is approximately a linear function of $m_1-m_2$ (possibly using modulo arithmetic), then one can use the hash function H(M)=floor(M/Q) where Q is a quantization value. As will be clear to those skilled in the art, many other hash functions are possible, and the use of any of them is within the scope of the present invention.

It is often the case that even though contours appear discontinuous, the gaps between the contour segments of a given contour are relatively small, and in such cases two contour segments are unlikely to belong to the same contour if their endpoints are distant, even if they seem otherwise compatible. In many applications, for example, if two short line segments are on opposite sides of an image but happen to be co-linear, they should not be considered part of the same contour (unless, of course, there is an intervening set of segments between the two). In such cases, it is desirable to use a hash function of the endpoint locations that represents a tiling of the space. For simplicity, a square or rectangular tiling can be used, although use of any tiling is within the scope of the present invention.

In an illustrative embodiment, the hash function, which will be referred to as the "spatial hash function," is $$H_S(x, y) = \mathrm{floor}((x-x_0)/s_x) + N_x * \mathrm{floor}((y-y_0)/s_y)$$

where (x, y) are the coordinates of one endpoint of a contour segment, $(x_0, y_0)$ are the coordinates of some arbitrary origin, $s_x$ and $s_y$ are the tile size in the x and y directions respectively, and $N_x$ is the number of hash values in the range needed to cover all x coordinates. For example, if one first computes the bounding box of all the endpoints, then one might choose $x_0$ to be the smallest (i.e. closest to negative infinity) xcoordinate of all the endpoints and $y_0$ to be the smallest y coordinate, in which case $N_x$=call$((x_{max}-x_0)/s_x)$, where $x_{max}$ is the largest x coordinate of all the endpoints. Note that "floor(x)" and "cell(x)" are the functions usually denoted in mathematical literature as $\lfloor x \rfloor$ and $\lceil x \rceil$, respectively. With this hash function, the hash values which are similar to a given hash value h (i.e. which represent elements in tiles adjacent in a 3×3 neighborhood to the given element) are h−1, h−$N_x$−1, h−$N_x$, h−$N_x$+1, h+1, h+$N_x$+1, h+$N_x$, and h+$N_x$−1. Note that for tiles on edges or corners, some of these hash values can be immediately neglected.

This hash function $H_S$ is applied to each of the two endpoints of a contour segment, so that a contour segment may have two hash values; a contour segment may have only one hash value if both of its endpoints lie in the same spatial bin. The segments are then made accessible by a "spatial hash table," which is a hash table where a contour segment is accessible by each of its hash values. Note that additional hash functions could also be applied to further reduce the number of possible candidates for joining to a given contour segment, such as a hash of the angle of a contour segment (assuming the segments were approximately linear). However, in practice, the spatial hash function alone suffices to make the number of candidates computationally feasible.

Figure 3A:
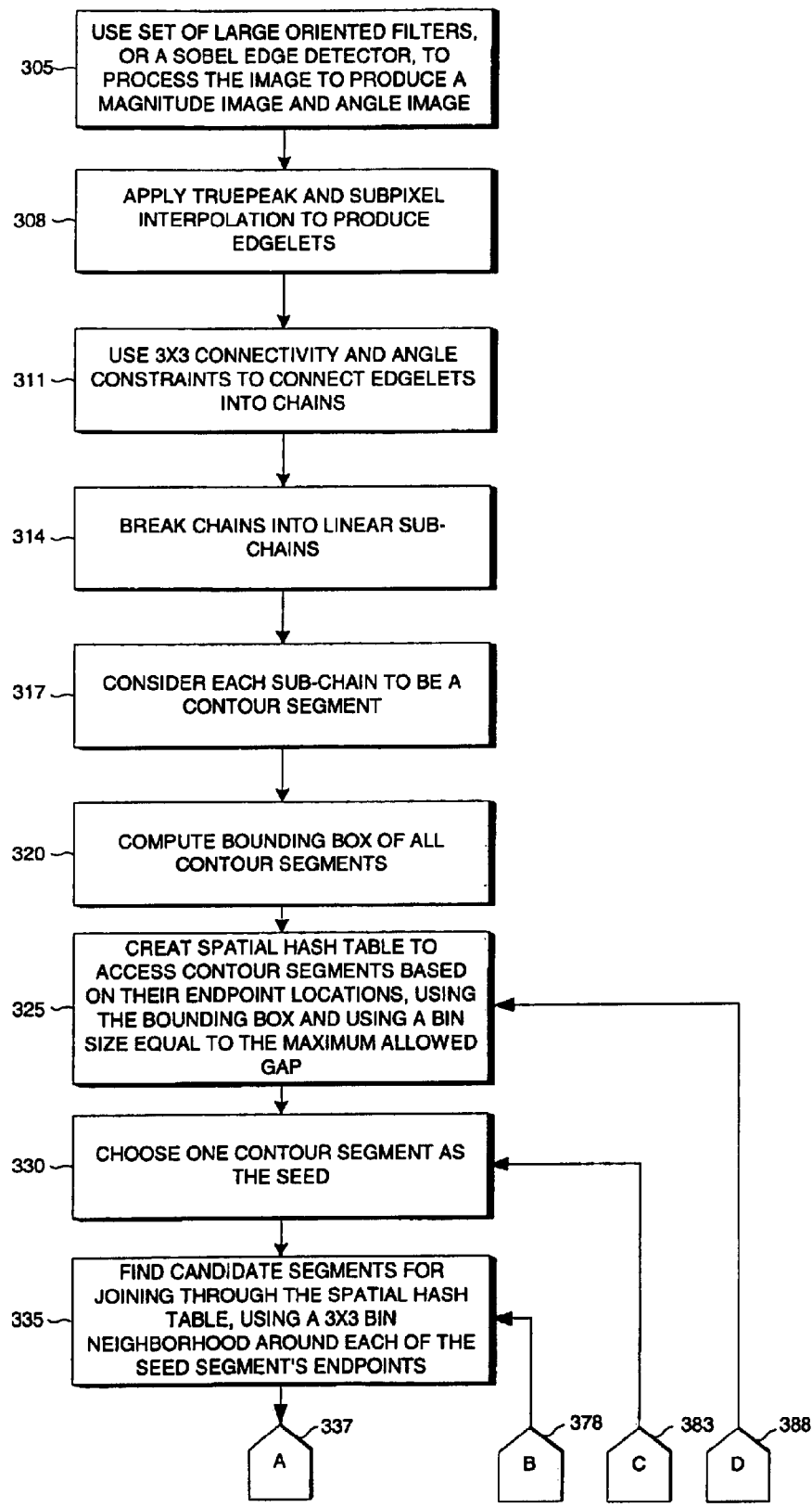
FIGS. 3A and 3B, when placed together, form a flow chart illustrating the steps performed to implement at least one embodiment of the present invention.
Figure 3B:
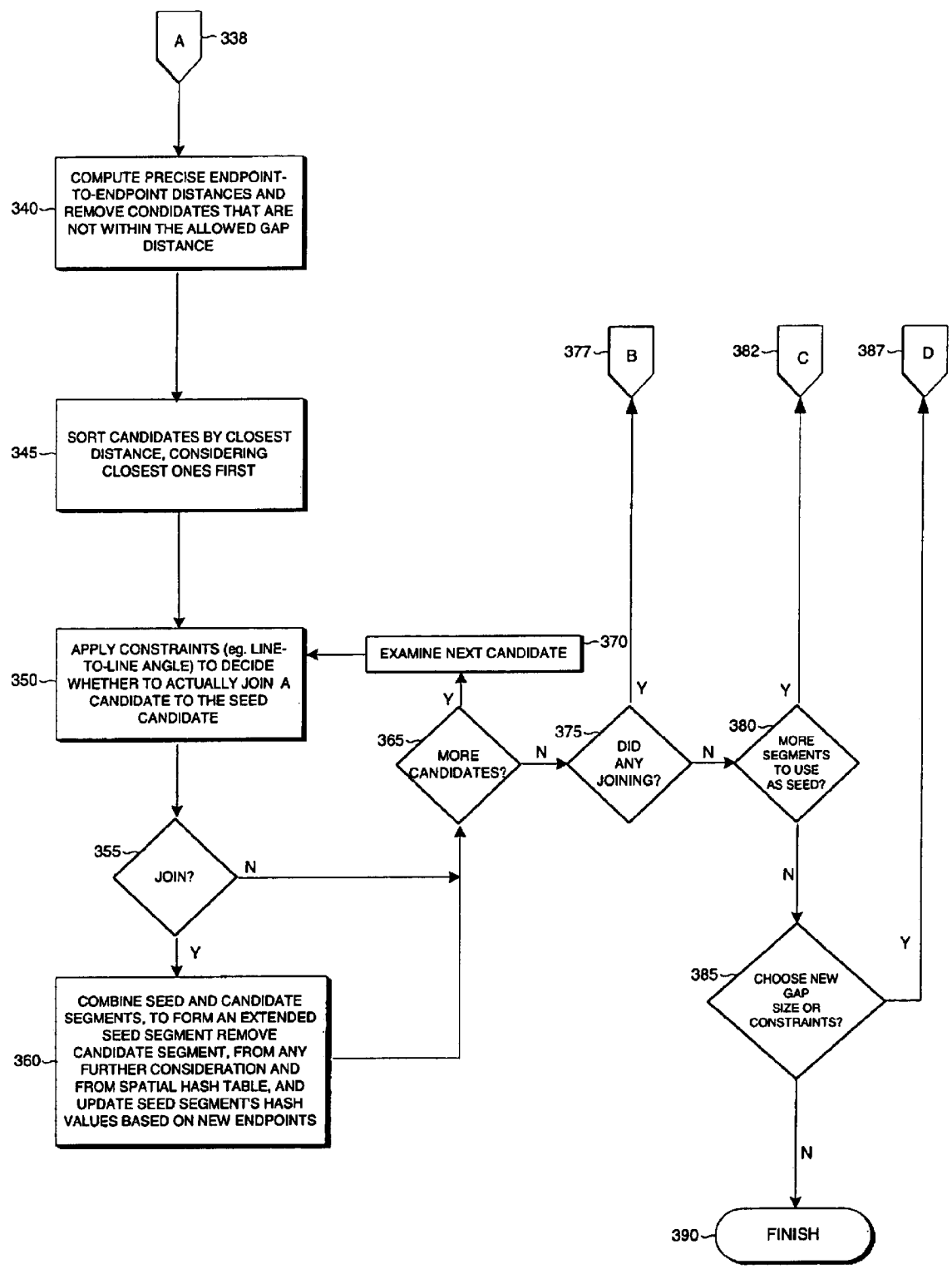
Figure 4:
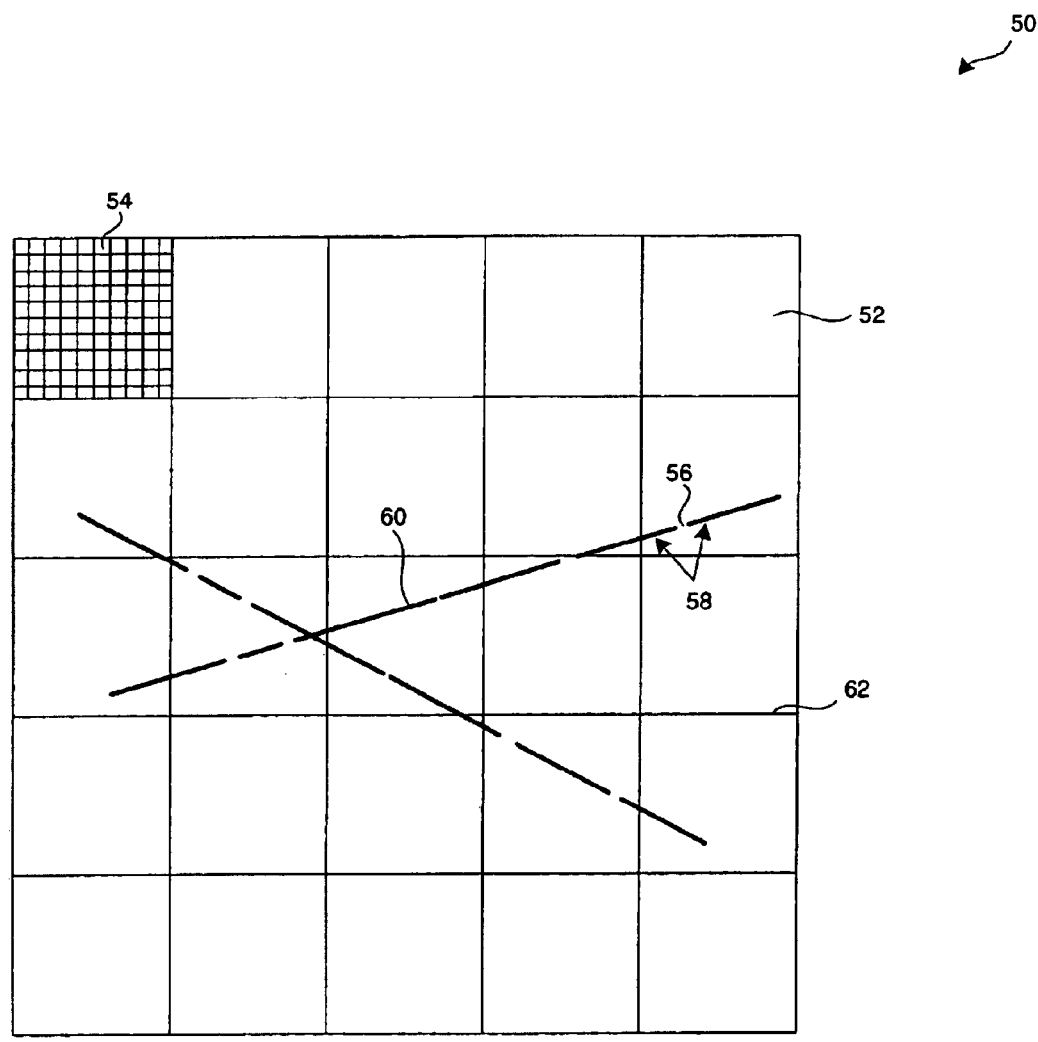
FIG. 4 is a graphical representation of an image space divided into spatial hash bins according to at least one embodiment of the present invention.

An illustrative embodiment of the invention is illustrated in more detail in the flowchart of FIG. 3 and the graphical representation of FIG. 4. First, in step 305, the input image is processed to produce a magnitude image and an angle image, using either a set of large oriented filters or a Sobel edge detector. Next, in step 308, truepeak and subpixel interpolation are applied to the magnitude and angle images to produce edgelets that have subpixel accuracy; this step may also use magnitude thresholding. Steps 305 and 308, taken together, correspond to the general feature-detection step 215.

Next, in step 311, connectivity in the 3×3 pixel grid sense and angle constraints are used to connect edgelets into unbranched chains. In step 314, the chains are broken into linear sub-chains based on RMS error of a line fit to subsections of the chain. At this point, some sub-chains may be discarded if they are very short (e.g. contain less than 4 edgelets) or have a low average magnitude. Steps 311 and 314, taken together, correspond to the general chaining step 220, with the sub-chains of step 314 corresponding to the chains of step 220.

Next, in step 317, the sub-chains are considered to be general contour segments, in order to make the general iterative or recursive structure of the method clearer.

The bounding box of all the endpoints of the contour segments is computed in step 320. In step 325, a spatial hash table is constructed using the bounding box and a bin size, and all the contour segments are made accessible through the hash table based on the spatial hash values of each of their endpoints. Note that the computation of the bounding box merely facilitates determining the range of possible hash values and may simplify construction of the hash table for some implementations. Also note that the bounding box should be enclosing but need not be tight; thus, one could simply use the boundaries of the image as the bounding box to avoid computing a tight bounding box.

For use in step 325, a bin size needs to be chosen for the spatial hash bin grid 50. The size of the bins 52 can be chosen depending on the size of allowable gaps 56 between sub-chains 58 that can be part of a single defect 60. If the bins 52 are too large, then the following steps of combining sub-chains 58 become too computationally intensive. If the bins 52 are too small, then only small gaps 56 will be allowed in reconstructing a defect 60. In the extreme cases, for example, a single bin 52 comprising an entire image would not reduce the set for comparison and would result in a maximal $O(N^2)$ number of comparisons. If the bins 52 were comprised of single pixel 54 locations then only sub-chains 58 having ends within one pixel 54 of each other would be candidates for joining. The illustrative implementation of the invention works well with bins 52 that are ten by ten pixel 54 squares. It should be noted that small sub-chains may be associated with only one bin 52, for example, if both ends of the sub-chain fall within the same ten by ten pixel 54 bin 52. Larger sub-chains 58 and small sub-chains 58 that cross-bin boundaries 62 are generally associated with two bins 52: one for each end.

The illustrative embodiment chooses the bin size based on the maximum gap distance G that is allowed between endpoints of two contour segments that can be considered for joining, and in fact chooses the bin size to be equal to the maximum gap size and considers all bins in a 3×3 neighborhood to be similar. With these choices, it is clear that all contour segments whose endpoints are within the maximum gap distance will be found. Some contour segments at greater distances (possibly up to $2G\sqrt{2}$) may also be found, and these may then be discarded by a more precise calculation of endpoint distance. One could also use a smaller bin size and a larger similarity neighborhood in order to decrease the number of candidates found and possibly to decrease or eliminate the need to perform a more precise calculation in order to discard some candidates, especially if the relevant constraint were only approximate anyway.

As part of step 325, the bin numbers of the endpoints of each contour segment are determined, and the contour segment is assigned to those bins (or to a single bin if the two bin numbers are the same). The bin number is simply the value of the spatial hash function $H_S$ described above, using the bounding box of all the sub-chain endpoints to obtain $x_0$, $y_0$, and $x_{max}$ and setting $s_x=s_y=G$. This step corresponds to hashing the sub-chains 58 into their respective bin or bins 52 based on the location of their endpoints, and also to step 230 of FIG. 2.

In step 330, one contour segment is chosen as the seed segment. Usually the longest segment is chosen, but one might also consider the segment's magnitude or other factors. In general, it is preferable to begin with the segment that is considered to be the most likely to be a real contour segment (e.g. not just noise), so that the actual contour segments are given a chance to grow before noise segments. Such ordering is not necessary, but it can produce more robust results.

In step 335, the hash values of the endpoints of the seed segment are used to find candidate segments for joining using the spatial hash table; all segments whose hash values are in a 3×3 bin neighborhood of the seed hash values are initially considered as candidates for joining. Note that there may be either one or two seed hash values, depending on whether both endpoints of the seed segment fall into the same hash bin. Also note that, if there are two seed hash values and they are in adjacent bins, then the two 3×3 neighborhoods overlap, and the method may take advantage of this to avoid duplicating access to the hash table. If contour segments also have polarity information (e.g. light-on-dark or dark-on-light, as might be determined using some oriented filters), then one might also choose to reject any candidates whose polarity differed from that of the seed segment. Typically, the use of the hash table can reduce the number of candidates from a few hundreds or thousands to just one or a very few.

Processing then proceeds, via off-page connectors 337 and 338, to step 340, where the precise endpoint-to-endpoint distance between the seed segment's endpoints and each candidate segment's endpoints is computed, and any candidates whose distance exceeds the allowed gap distance is removed from the set of candidates. In this way, the method removes slightly more distant candidates that may have been included simply because of the quantizing nature of the spatial hash table. Note that, because a segment has two endpoints, there are four possible distances one may compute between two segments; the minimum of these four is taken to be the distance between the segments. One may also use an allowed gap distance that varies, such as one that is a function of the two segments under consideration. For example, one might want to have a maximum gap distance of 50 pixels, but limit the actual allowed gap distance to be the length of the longer of the two segments, in order to decrease the chance of connecting two unrelated segments.

Next, in step 345, the candidates are sorted by their minimum endpoint-to-endpoint distance from the seed segment, with the closest segments at the beginning. This sorting is done to facilitate greedily growing the seed segment and following the most likely contour, and generally one should consider the most likely matches first. One might also consider all matches and then choose the best. For example, in some applications it might be better to consider candidate segments whose angles matched most closely first, instead of those whose endpoints were closest first.

In step 350, contour constraints are applied to decide 355 whether to actually join a given candidate segment with the seed segment. For example, the angle between the two segments might be compared, and the candidate would be accepted only if the angles were fairly close, e.g. within 30 degrees, and the total RMS fit error to a single line of all the points of the two segments were below some threshold, e.g. 0.5 pixels.

If the decision is made to join the candidate segment with the seed segment, then the joining is performed in step 360; otherwise, processing proceeds with step 365. The joining typically involves updating the seed segment (e.g. to have new endpoints, RMS fit error values, curvature values, etc., depending on the nature of the segments), removing the candidate segment from any further consideration (e.g. for joining with other potential seed segments or for being considered as a seed segment itself) and from the spatial hash table, and updating the seed segment's hash values (e.g. because its endpoints changed). Note that joining does not always imply endpoint-to-endpoint connection, and other techniques might be more appropriate depending on the nature of the contour segments and the desired contours. Processing then proceeds with step 365, where a determination is made as to whether there are more candidates remaining to be considered for joining.

In step 365, if there are more candidates, then the next candidate is examined in step 370 and processing returns to step 350; if there are no more candidates, processing continues with step 375. In step 375, a determination is made whether any candidates were joined to the seed segment (during any iteration of step 360). If such joining ever occurred, then the seed segment may have altered in such a way that there may now be additional segments that would be candidates for joining with it, so the process returns, via off-page connectors 377 and 378, to step 335 to find new candidates.

If no joining was done, then the process proceeds with step 380, where a determination is made whether there are more segments that should be used as a seed segment. Typically, any remaining segment which has not yet been considered as a seed segment should be used; note that any segments that were joined to another segment were already removed from consideration in step 360. If there is another potential seed segment, then processing returns, via off-page connectors 382 and 383, to step 330; otherwise, processing continues with step 385.

In step 385, a determination is made whether to continue processing with a new gap size and/or new constraints. For example, one may wish to progressively build up larger more reliable contour segments by first using a relatively small gap size to form larger contour segments that are more reliable than the initial chains, discarding segments that are too short or have low magnitude, and then using a larger gap size to find further connections among the new segments. One might also perform an initial iteration that enforces linear constraints to find long line segments and then perform a second iteration that allows curvature or bending when connecting those line segments. In an illustrative embodiment for fiber end-face inspection, three passes may be used. The first pass uses a gap distance of ten pixels and uses linear constraints, after which all line segments shorter than ten pixels are discarded. The second pass uses a gap distance equal to the radius of the fiber cladding and uses linear constraints. Finally, a third pass uses a gap distance of ten pixels and allows significant bends (up to 90 degrees) between line segments; the final contours are simply represented as the set of connected line segments. As a result of the techniques used for polishing fiber end faces, most scratches tend to appear as long straight lines, although some are curves with a large radius of curvature and some have one or two sharp kinks. Thus the multiple-pass approach tries to build up the most likely contours first.

By varying the rules to accept connections, alternative embodiments of the invention can accept various contours such as curves and splines that do not necessarily have a particular shape. This overcomes a substantial limitation of Hough transform methods, which do require advance knowledge of contour shapes in order to detect them. Additional more complex connectivity rules can also be used to avoid creating certain unusual intersection shapes.

If, in step 385, a decision to use a new gap size and/or constraints is made, then the process returns, via off-page connectors 387 and 388, to step 325, where a new spatial hash table is constructed, if necessary. If no new gap size or constraints are to be used, then the process finishes with step 390.

Although illustrative embodiments of the invention are described herein in terms of finding scratch features in images of optical fiber end-face surfaces, persons of ordinary skill in the art should appreciate that the method according to the invention can be practiced to locate any number of features in image data. Furthermore, although the illustrative embodiments are described herein in terms of combining linear sub-chains to form contours, persons of ordinary skill in the art should recognize that sub-chains may be defined with any number of qualifying characteristics (other than mere linearity) as basic building blocks of alternative contours without departing from the scope of the present invention.

Although the various embodiments of the invention are described herein in terms of a hash table having uniform square bins, persons of ordinary skill in the art should appreciate that the invention can be practiced using any of various configurations of bins, including rectangular bins and bins of varying dimension and shape across an image. For example, hexagonal bins might be used. Similarly, hash similarity neighborhoods other than a square 3×3 bin neighborhood may be used in alternative embodiments of the present invention; for larger neighborhoods, one might even consider other neighborhood shapes, such as neighborhoods that approximate circles rather than squares.

Although the local neighborhood for considering chaining true peaks in illustrative embodiments of the invention is described in terms of the three-by-three pixel area centered on a pixel of interest, persons of skill in the art should appreciate that neighborhoods of different dimensions can also be considered without departing from the spirit and scope of the invention. Also, although the local chaining technique is described as requiring edgelets to be adjacent in a 3×3 pixel area, persons of skill in the art should appreciate that such a strict adjacency requirement may be relaxed, especially when using a larger neighborhood size.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a data communications medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, although an embodiment for fiber end-face inspection was discussed, those skilled in the art will appreciate that the invention can be applied to a great many other applications, such as inspection of laser diodes or lenses, or inspection of automobile paint finish, or automatic generation of a geometric description of an object in an image for use in alignment. Use of any such embodiment for the purposes described herein is within the spirit and scope of the invention. Other aspects, such as the specific instructions utilized to achieve a particular function, as well as other modifications to the inventive concept are intended to be covered by the appended claims.

What is claimed is:

1. A method of identifying contours in an image comprising the steps of:

extracting features from said image;

forming chains from localized subsets of said features;

computing the values of one or more hash functions for contour segments, wherein each said contour segment comprises at least one of said chains;

identifying, using said values for said contour segments, candidate contour segments for joining;

selecting contour segments for joining from said candidates; and joining said selected contour segments to form joined contour segments.

2. The method according to claim 1 further comprising the step of repeating said steps of identifying, selecting, and joining for additional contour segments.

3. The method according to claim 2 further comprising the step of computing additional hash functions for said additional contour segments.

4. The method according to claim 1 wherein said step of forming chains includes applying one or more chaining constraints.

5. The method of claim 1 wherein said step of selecting contour segments includes using contour constraints.

6. The method according of claim 1 wherein said step of extracting features comprises the steps of:
applying a set of filters to said image to produce a magnitude image and an angle image; and
applying truepeak and subpixel interpolation to said magnitude image and said angle image to produce said features.

7. The method according to claim 6 wherein said features comprise edgelets.

8. The method according to claim 6 wherein said filters comprise large oriented filters.

9. The method according to claim 6 wherein said filters comprise Sobel filters.

10. The method according to claim 7 wherein said step of forming chains comprises the steps of:
applying 3 by 3 connectivity and angle constraints to connect said edgelets into chains; and
breaking said chains into linear sub-chains.

11. The method according to claim 10 wherein said linear sub-chains are based on Root Mean Square (RMS) error of a line fit to subsections of said chain.

12. The method according to claim 10 further comprising the step of discarding sub-chains that are shorter than a predetermined length.

13. The method according to claim 10 further comprising the steps of discarding sub-chains that have a low average magnitude.

14. The method according to claim 10 wherein said step of computing one or more hash functions comprises the step of computing a bounding box including all endpoints of said sub-chains.

15. The method according to claim 14 further comprising the steps of:
constructing a spatial hash table using said bounding box and a bin size;
making said sub-chains accessible with said hash table according to spatial hash values of endpoints of each of said sub-chains.

16. The method according to claim 15 wherein said bin size is based upon a maximum allowable gap between endpoints of sub-chains being considered for joining.

17. The method according to claim 15 further comprising the step of identifying a seed sub-chain from said sub-chains.

18. The method according to claim 17 further comprising the step of identifying candidate sub-chains for joining through said spatial hash table using 3 by 3 bin neighborhoods around each endpoint of said seed sub-chain.

19. The method according to claim 18 further comprising the steps of:
computing sub-chain endpoint to endpoint distances; and
removing sub-chain candidates from consideration for joining if said endpoint to endpoint distances are not within predetermined allowable gap distances.

20. The method according to claim 19 further comprising the steps of:
sorting candidate sub-chains by said endpoint distances; and
considering for joining said sub-chains in order according said endpoint distances wherein said sub-chains having the smallest endpoint distances are considered first.

21. The method according to claim 20 further comprising the step of applying constraints to determine whether to join said candidate sub-chains.

22. The method according to claim 21 wherein said constraints include a line to line angle.

23. The method according to claim 21 further comprising the steps of:
combining said seed sub-chain with a candidate sub-chain to form an extended seed sub-chain;
removing said candidate sub-chain from consideration for further joining;
removing said candidate sub-chain from said spatial hash table; and
updating a hash value of said seed sub-chain according to end-points of said extended seed sub-chain.

24. The method according to claim 23 further comprising the steps of repeating said steps of applying constraints, combining, removing said candidate sub-chain from further consideration, removing said candidate sub-chain from said spatial hash table, and said updating step until no candidate sub-chains remain.

25. The method according to claim 24 further comprising the steps of repeating said steps including and following said step of identifying candidate sub-chains until no more candidate sub-chains are available for joining.

26. The method according to claim 25 further comprising the steps of repeating said steps including and following said step of identifying a seed subchain until no more sub-chains are available to use as a seed sub-chain.

27. The method according to claim 26 further comprising the step of:
selecting a new maximum allowable gap size; and
repeating said steps following said step of selecting a maximum allowable gap.

28. The method according to claim 1 where said joined contour segments comprise contours.

29. The method according to claim 7 wherein said step of forming chains comprises
the step of applying 3 by 3 connectivity and angle constraints to connect said edgelets into chains.

30. A method of identifying scratch defects in an image of a fiber end comprising the steps of:
extracting features from said image using oriented filters;
forming chains from localized subsets of said features using 3 by 3 connectivity rules;
constructing a spatial hash table for contour segments using contour segment endpoints, wherein each said contour segment comprises at least one of said chains;
identifying, using said spatial hash table, candidate contour segments for joining;
selecting contour segments for joining from said candidates; and
joining said selected contour segments to form identified scratch defects.

* * * * *